(12) United States Patent
Vanden Bossche (10) Patent No.: US 9,419,784 B2
(45) Date of Patent: Aug. 16, 2016

(54) SYSTEM AND METHOD FOR CALIBRATING AND SYNCHRONIZING A RECEIVER

(71) Applicant: National Instruments Ireland Resources Limited, Dublin (IE)

(72) Inventor: Marc Vanden Bossche, Bornem (BE)

(73) Assignee: National Instruments Ireland Resources Limited, Dublin (IE)

( * ) Notice: Subject to any disclaimer, the term of this patent is extended or adjusted under 35 U.S.C. 154(b) by 0 days.

(21) Appl. No.: 14/434,789

(22) PCT Filed: Oct. 7, 2013

(86) PCT No.: PCT/EP2013/070806
§ 371 (c)(1),
(2) Date: Apr. 10, 2015

(87) PCT Pub. No.: WO2014/056836
PCT Pub. Date: Apr. 17, 2014

(65) Prior Publication Data
US 2015/0280899 A1    Oct. 1, 2015

Related U.S. Application Data (60) Provisional application No. 61/713,044, filed on Oct. 12, 2012.

(51) Int. Cl.
*H04L 7/00* (2006.01)
*H03K 9/00* (2006.01)
(Continued)

(52) U.S. Cl.
CPC .............. *H04L 7/0087* (2013.01); *H04B 17/20* (2015.01); *H04B 17/0085* (2013.01)

(58) Field of Classification Search
USPC .............. 375/240, 240.26–240.28, 285, 284, 375/293, 295, 302, 306, 307, 316, 322, 324, 375/325, 327, 328, 338, 339, 340, 346, 349, 375/354, 355, 356, 357, 359, 362, 363, 364, 375/365, 367, 368, 373–376
See application file for complete search history.

(56) References Cited

U.S. PATENT DOCUMENTS 5,163,070 A * 11/1992 Bielby .................... H04L 7/042
375/367
6,128,390 A * 10/2000 Kimura .................. H04H 60/23
380/268

(Continued)

FOREIGN PATENT DOCUMENTS

EP          2 290 382 A1    3/2011

*Primary Examiner* — Linda Wong
(74) *Attorney, Agent, or Firm* — Meyertons Hood Kivlin Kowert & Goetzel, P.C.; Jeffrey C. Hood (57) ABSTRACT

The present invention relates to a system for calibrating and for synchronizing a receiver. The system is arranged for receiving a reference clock signal in a first and a second signal path and comprises
generator means for generating in the first signal path a first plurality of phase coherent tones derived from said reference clock signal and for generating in the second signal path a second plurality of phase coherent tones derived from said reference clock signal, said second plurality of phase-coherent tones being at lower frequencies than said first plurality of phase-coherent tones, and
gating means for gating said first plurality of phase coherent tones by said second plurality of phase-coherent tones, such that the phase-coherent tones of said second signal path appear in a distorted version around tones of said plurality of phase-coherent tone of said first signal path, and for outputting a resulting gated signal.

23 Claims, 5 Drawing Sheets

(51) Int. Cl.
  *H04L 27/00*  (2006.01)
  *H03D 3/18*   (2006.01)
  *H04B 17/20*  (2015.01)
  *H04B 17/00*  (2015.01)

(56) References Cited

U.S. PATENT DOCUMENTS

| | | |
|---|---|---|
| 8,605,850 B2 | 12/2013 | Anderson et al. |
| 2003/0123413 A1* | 7/2003 | Moon ................ H04J 13/0048 370/335 |
| 2004/0000934 A1* | 1/2004 | Jeon ................... H03K 21/10 327/115 |
| 2004/0145990 A1* | 7/2004 | Chang ................. G11B 19/12 369/53.24 |
| 2004/0152436 A1 | 8/2004 | Masenten et al. |
| 2008/0232808 A1* | 9/2008 | Watanabe ........... H04B 10/299 398/92 |
| 2010/0172168 A1* | 7/2010 | Fells ................... H02J 7/025 363/164 |
| 2011/0012648 A1* | 1/2011 | Qiao ................... H03B 19/00 327/141 |
| 2011/0080484 A1* | 4/2011 | Park ..................... H04N 5/145 348/180 |
| 2011/0080902 A1* | 4/2011 | Jang ................... H04B 1/70752 370/344 |
| 2011/0150240 A1* | 6/2011 | Akiyama .............. H04B 11/00 381/98 |
| 2011/0169580 A1* | 7/2011 | Dodrill ................ H03B 29/00 331/56 |
| 2012/0120989 A1* | 5/2012 | Toriyama ........... G06K 19/0712 375/219 |
| 2012/0288044 A1* | 11/2012 | Roberts ................ H03L 7/00 375/350 |
| 2013/0085762 A1* | 4/2013 | Mano .................. G10L 19/265 704/500 |

* cited by examiner

Fig.1

Fig.2a $$y(t) = \sum_i \underline{a_i}(t) \times e^{j2\pi f_i t}$$

SYSTEM AND METHOD FOR CALIBRATING AND SYNCHRONIZING A RECEIVER

FIELD OF THE INVENTION

The present invention is generally related to the field of measurement systems for electronic components and devices. More in particular, it relates to calibration and synchronization techniques for use with such systems.

BACKGROUND OF THE INVENTION

In many cases high-frequency components are being characterized with a sine wave signal. Due to the non-linear behaviour of components the resulting signals contain harmonics.

Figure 1:
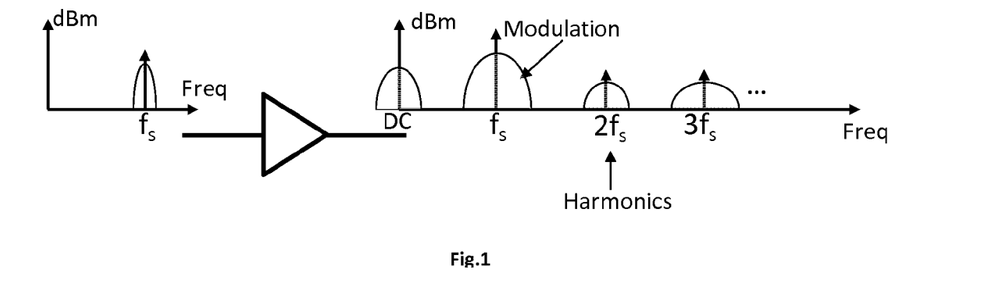
FIG. 1 illustrates some modulated harmonics of an amplified and distorted test signal.

To test components in more realistic circumstances, often a modulated sine wave is applied. Due to the non-linear behaviour of the component under test, the resulting signal now contains modulated harmonics. The modulation bandwidth increases due to the non-linear behaviour and increases with the number of harmonics. Also around DC, the modulation can manifest itself (FIG. 1).

Figure 2A:
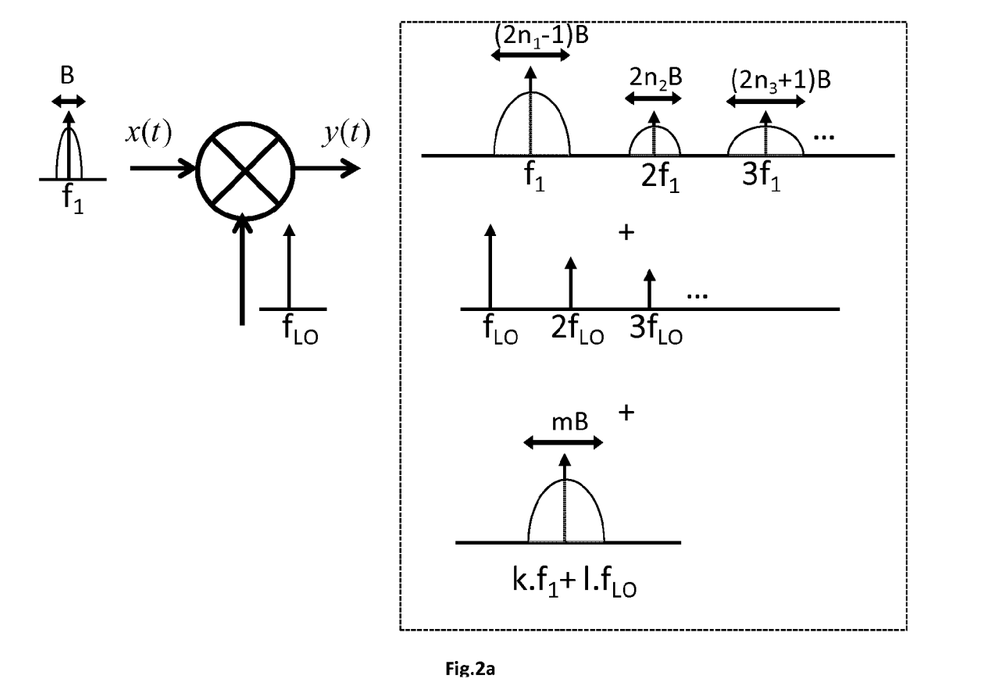
FIG. 2a illustrates the mixing of a modulated signal with the local oscillator frequency and its harmonics.

When testing mixers under modulation conditions, one can expect harmonics of the local oscillator (LO) frequency and of the main modulated input frequency and mixing products of both to be present at all mixer ports. As such one can identify different discrete tones in the frequency domain at the mixing products of the LO frequency $f_{LO}$ and the main input frequency $f_1$, also called the carrier. These tones are being modulated and possibly broadened depending on the mixing products (FIG. 2a).

Figure 2B:
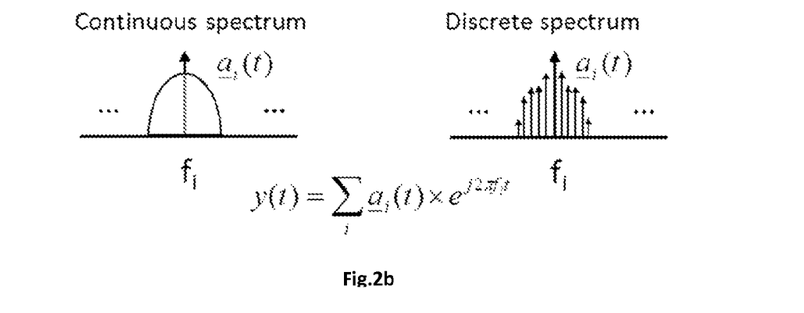
FIG. 2b illustrates a mathematical description of the considered type of modulation signals with discrete or continuous spectrum around a discrete set of tones.

The analogue signals x(t) under consideration comprise a set of discrete tones (including DC) which are modulated. The modulation possibly can come from different sources and may be phase coherent or phase incoherent. The modulation signals themselves can have a discrete or continuous spectrum as illustrated in FIG. 2b.

Figure 3:
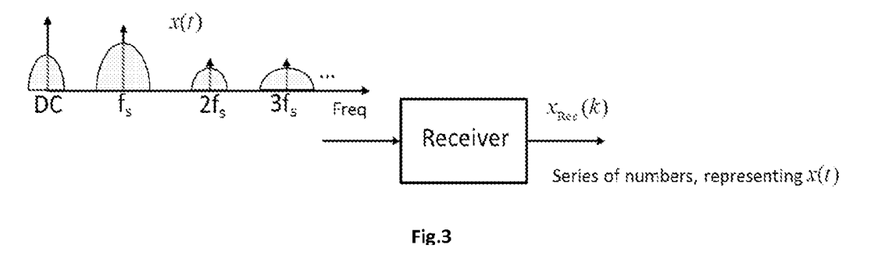
FIG. 3 illustrates the conversion of an analogue signal into a digital representation.

This type of signal x(t) is measured with one or another type of receiver, converting the analogue signal into a set of numbers $x_{Rec}(k)$ that represent the input signal (FIG. 3). These numbers can be in time-domain or frequency-domain or a combination thereof. The representation domain is not of any importance.

The receiver measuring the above type of signals is kept in its linear region of operation by limiting the signal peak amplitude, thus avoiding the introduction of any non-linear effect on the measured signal. Nevertheless, the receiver distorts the signal in amplitude and phase as function of the frequency through its inherent linear filtering characteristics. Due to this linear filtering effect represented by a transfer function, it is not possible to reconstruct the original signal x(t) directly from the numbers $x_{Rec}(k)$ in the representation domain.

To reconstruct/measure the high frequency signal x(t) correctly, it is necessary to determine the receiver transfer characteristic in amplitude and phase as a function of frequency. To determine the transfer function, one applies a well known input signal x(t), resulting into a series of numbers $X_{Rec}(k)$ from which the distorting transfer function can be calculated accurately. This signal, which is called "reference" or "calibration" signal, is further assumed to be perfectly known.

To measure/reconstruct a signal being distorted by the receiver, the transfer function must be determined at the frequencies or frequency bands related to the measured signal. As such also the "reference" signal must have power at the frequencies and/or in the frequency bands where one needs to know the transfer function. To determine the transfer characteristic accurately, in many cases a frequency-selective measurement is performed to determine amplitude and phase distortion at discrete frequency tones. Therefore, the "reference" signal is created so that it contains discrete tones by making sure that the "reference" signal is a periodic signal.

There is a need for an efficient hardware implementation to create a reference signal with discrete tones, optimized for the type of signals of FIG. 2b such that power is present at frequencies and frequency bands of interest.

To determine the transfer function in amplitude, well-known power calibration techniques exist. To determine the transfer function in phase, one technique is to apply a signal known in phase (calibration or reference signal) at the receiver input and to compare the measured response with the known signal. Possibly the interaction of the receiver with the device generating the calibration signal needs to be characterized and corrected for. Different means, like a network analyzer set-up, can be used for this purpose by measuring the reflection factor of the device generating the reference signal and by assuming a flow graph as equivalent model. This type of correction is well known in the art.

Further also techniques exist to know the phase content of the calibration or reference signal. This signal is typically a narrow pulse with a broad frequency content. Knowing the signal not only in phase but also in power allows determining at the same time the amplitude and phase of the receiver transfer function.

Only real-time receivers have the possibility to measure a one-shot broadband calibration signal and even with this type of receivers it is better to apply a periodic signal to improve signal-to-noise ratio by measuring longer traces, equal to a multiple of periods. To determine the transfer function using one or another form of a well known periodic signal, the calibration or reference signal must have power at least at the frequencies of interest.

Figure 4:
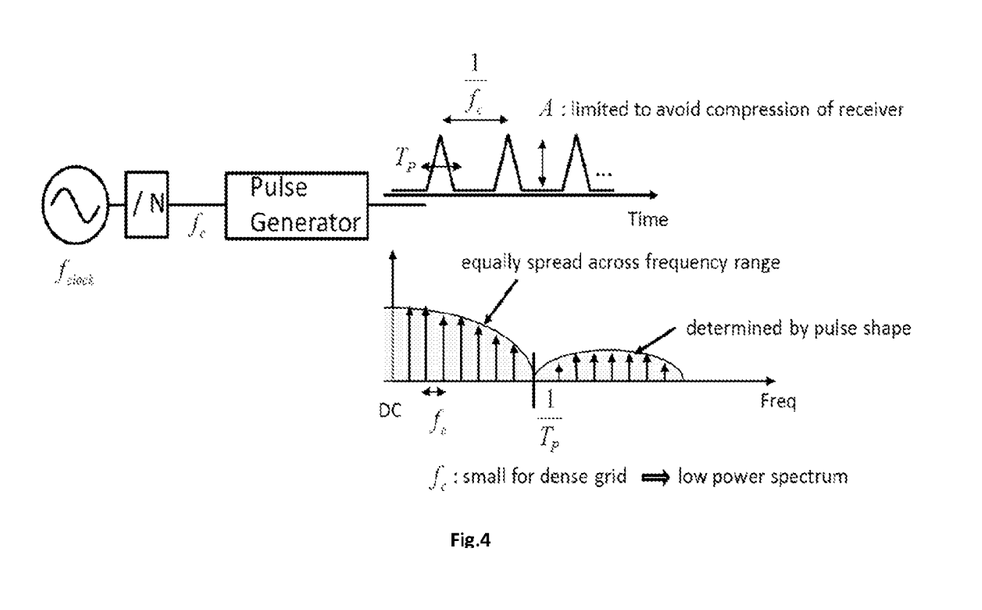
FIG. 4 illustrates a prior art solution wherein a dense frequency grid is created by means of a narrow pulse fired with low periodicity.

Nowadays this is typically done by creating a dense enough frequency grid by using a narrow pulse, which can be characterized accurately and which is fired with a low periodicity. The pulse width in combination with the pulse shape determines the highest available frequency components and the periodicity of firing determines the frequency grid density (FIG. 4). To create a dense grid, the fundamental frequency of the harmonics must be below. A fundamental problem with this approach is that the power spectrum is very low in power because the peak amplitude of the pulse must be limited in order not to overdrive the receiver to avoid any non-linear distortion on the signal to be measured. As such a large dynamic range is required for the receiver just to perform the calibration. This can be understood easily. Suppose one wants to measure a RF signal with 1 GHz carrier, three harmonics and modulated with a signal of 10 kHz periodicity. This results in discrete tones of k×1 GHz+l×10 kHz, which is a sparse frequency grid. With the approach illustrated in FIG. 4, one runs a pulse generator at the low frequency rate of 10 kHz to create a dense grid of tones to cover the required frequency grid. To cover the highest required harmonic of 3 GHz, the pulse needs to be very short compared to the repetition rate. Therefore, there is only power present during a very short time compared to the repetition rate of 0.1 ms. As a result the power spectrum is very low because the power spreads across all the spectrum components with a spacing of 10 kHz at least up to 3 GHz (300 000 spectral components).

Figure 5:
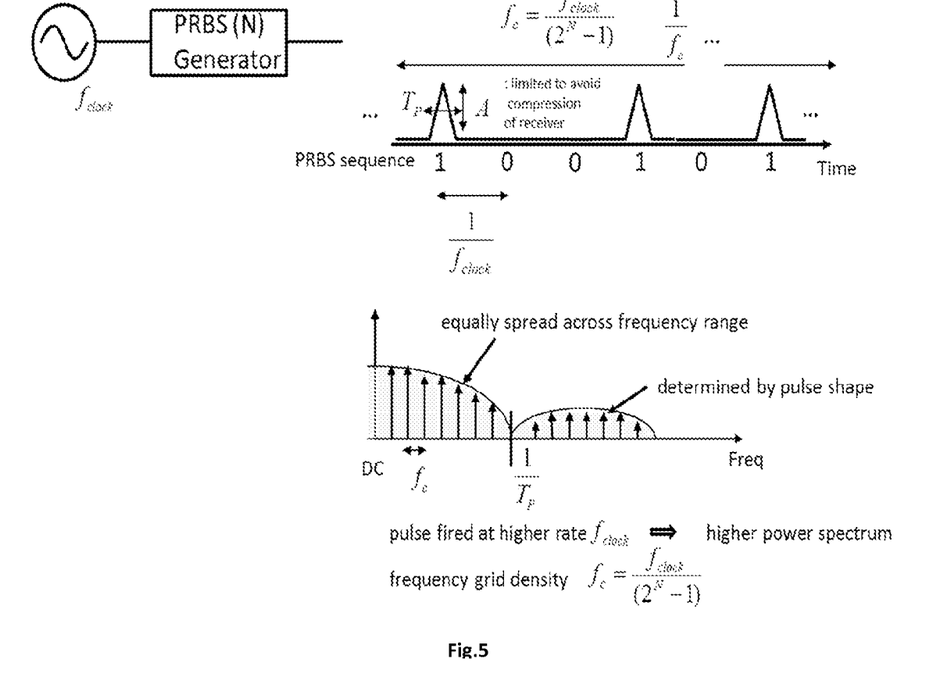
FIG. 5 illustrates a prior art solution wherein a PRBS sequence is applied to increase the power spectrum.

It is known that by using a Pseudo-Random Binary Sequence (PRBS) sequence it is possible to increase the power spectrum (FIG. 5). However, for both cases the frequency grid density is equally spaced from DC to the highest frequency components, which in most cases covers many more frequencies than required by the measurement signals. The power spectrum is higher because the pulses are fired at a higher frequency and the periodicity is realized by dropping out pulses in a specific sequence, determined by the PRBS sequence.

Certain receivers are narrowband and cannot measure the signals as illustrated in FIG. 3 at once. They need to scan the measured signal frequency band by frequency band and need to reconstruct the original analogue signal after the conversion to numbers. Jumping from frequency band to frequency band the phase coherence is lost for most receiver topologies. To establish phase coherence though, an additional separate receiver, coherently measuring in parallel with the measurement receiver, measures a signal having the same properties as the above-mentioned calibration or reference signal. This calibration or reference signal has phase coherence by construction. The difference is that for this signal one does not need to know the phase values of the spectral components. The only requirement is that the signal be stable so that the measured signal can be normalized against it. This signal is referred to as a "synchronization signal". As such the "synchronization signal" is the same as the "calibration or reference signals" except that one does not need to know its phase values neither the amplitude values.

In the prior art solutions as explained above, the power of the "reference" or the "synchronization" signal is smeared over the full frequency range of the signal with a spectral density equal to the periodicity of the signal. As such the power spectral density function is very low and requires a high dynamic range of the receiver already only for calibration or synchronization purposes. Hence, there is a need for a solution where the frequency tones (and as such the available power of the signal) are concentrated around a discrete list of tones, typically the fundamental frequency and some of its harmonics, or even are concentrated on an arbitrary given set of frequencies, depending on the signals to characterize. This solution can be used to determine the phase characteristic of a receiver with a lower dynamic range at the frequencies of interest. The frequencies of interest are enforced by the type of signals to measure. Also this solution can be used to synchronize the receiver with a synchronization signal at a lower dynamic range while moving from one frequency to another.

SUMMARY OF THE INVENTION

It is an object of embodiments of the present invention to provide for a system and method for calibrating and synchronizing a receiver device, wherein the requirements of a large dynamic range for the receiver can be reduced. It is a further object to provide a method for calibrating and synchronizing a receiver device wherein an equal power spread across the full frequency range is avoided.

The above objective is accomplished by the solution according to the present invention.

In a first aspect the invention relates to a system for calibrating and for synchronizing a receiver. The system is arranged for receiving a reference clock signal in a first and a second signal path and comprises generator means for generating in the first signal path a first plurality of phase coherent tones derived from said reference clock signal and for generating in the second signal path a second plurality of phase coherent tones derived from said reference clock signal, said second plurality of phase-coherent tones being at lower frequencies than said first plurality of phase-coherent tones, and gating means for gating said first plurality of phase coherent tones by said second plurality of phase-coherent tones, such that the phase-coherent tones of the second signal path appear in a distorted version around tones of said plurality of phase-coherent tones of the first signal path, and for outputting a resulting gated signal.

Due to the fact that both signal paths receive a same reference clock signal, synchronous operation in both paths is ensured. In the first signal path a first set of phase coherent tones is generated, while in the second signal path another set of phase coherent tones is generated at lower frequencies than in the first set. By providing gating or multiplying means generator pulses of the first signal path are gated at a much lower frequency rate by the generator pulses of the second signal path, which allow generating dense spectral components around the spectral components of the sparse frequency grid created by the generator in the first signal path. The proposed system can be used both for calibration purposes and for synchronization of a receiver.

In a preferred embodiment the system comprises storage means for storing at least one characteristic of the outputted gated signal.

In an advantageous embodiment the gating means is implemented with logic circuitry.

Preferably the system further comprises a pulse generator arranged for receiving the outputted gated signal and for narrowing pulses in the outputted gated signal. This represents the most preferred way to implement the system in practice.

In a preferred embodiment the generator means comprises in the first signal path and/or the second signal path a divider to reduce the frequency of the reference clock signal.

In a preferred embodiment the generator means comprises in the first signal path and/or the second signal path a bit sequence generator to adapt the periodicity of the bit sequence generator output signal by leaving out pulses so that a periodicity is obtained that yields a dense grid and with more power than with just a divider. Advantageously the bit sequence generator is a pseudo-random bit sequence generator. In another advantageous embodiment the bit sequence generator is a periodic bit sequence generator arranged for synthesizing a specific pattern of phase-coherent tones.

In a further embodiment the generator means further comprises in the first signal path and/or the second signal path a bit sequence generator and a divider to reduce the frequency of the reference clock signal.

Preferably the system comprises a frequency synthesizer for modifying the frequency of the reference clock signal.

In one embodiment at least a part of the generator means is implemented on a field programmable gate array.

In another aspect the invention also relates to a method for calibrating and for synchronizing a receiver. The method comprises receiving a reference clock signal in a first and a second signal path, generating in the first signal path a first plurality of phase coherent tones derived from the reference clock signal and generating in the second signal path a second plurality of phase coherent tones derived from the reference clock signal, said second plurality of phase-coherent tones being at lower frequencies than the first plurality of phase-coherent tones, gating the first plurality of phase coherent tones by the second plurality of phase-coherent tones, such that the phase-coherent tones of the second signal path appear in a distorted version around tones of the plurality of phase-coherent tones of the first signal path, and outputting a resulting gated signal.

In a preferred embodiment the generation of said first and/or said second plurality of phase coherent tones is performed using a bit sequence generator.

In an advantageous embodiment a periodic bit sequence is applied for synthesizing a specific pattern of phase-coherent tones.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention aims to present a solution to calibrate at least in phase and/or synchronize a receiver as function of a set of discrete frequencies, optimally chosen for the types of signals to be used during test while reducing the requirement on the dynamic range of the receiver.

As already mentioned, the modulation may in principle be phase coherent or phase-incoherent. In the present invention, however, the phase-coherent case is assumed, which is the most difficult to measure properly. Being able to deal with the phase-coherent situation provides also the solution in case the modulations are phase-incoherent.

Pulse generators used to create frequency tones are also referred to as comb generators. Pulse or comb generators to calibrate and/or synchronize receivers on a dense frequency grid are as such known in the art. They use a low repetition rate of the pulse driven by a reference clock signal (possibly followed by a divider IN) to create a dense equidistant frequency grid with spectral content up to the highest spectral component, determined by the pulse width and pulse shape. To increase the power level of the power spectrum, a Pseudo Random Bit Sequence (PRBS) can be used. A similar spectral density is achieved but with increased power level, because the periodicity is not achieved by dividing the pulse rate but by eliminating pulses. As such, more power is available for the same period.

Figure 6:
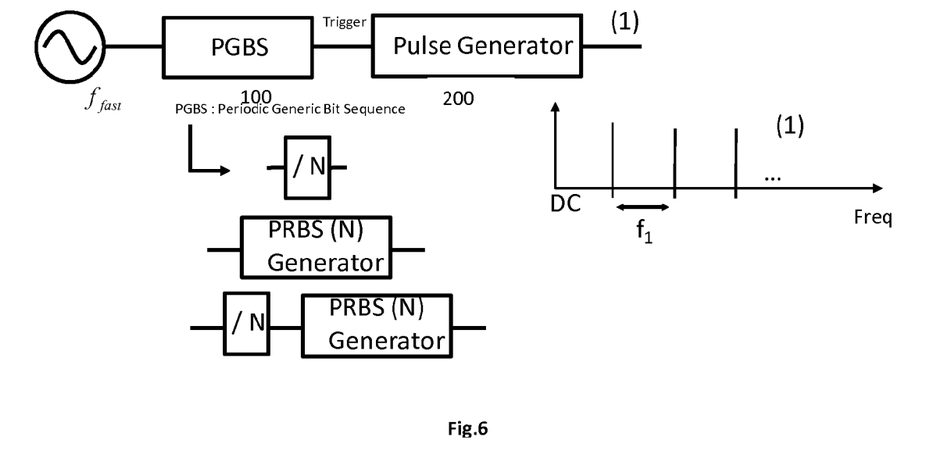
FIG. 6 represents a scheme with a PGBS and a pulse generator to generate a narrow pulse. Also the location of the tones in the spectrum at the pulse generator output is shown.

Existing comb generators are represented in FIG. 6, where the Periodic Generic Bit Sequence (PGBS) 100 stands for different concrete implementations, as illustrated also in FIG. 6: a reference clock signal followed by a divider (/N, possibly with N=1) or by a Pseudo Random Bit Sequence (PRBS) generator or by a divider followed by a PRBS. The PGBS can be followed by a pulse generator 200 or pulse shaping network that will generate a narrow pulse driven by the PGBS output. Thanks to the pulse, which is much narrower than the pulses generated by the PGBS, the discrete spectrum is extended in frequency. FIG. 6 also illustrates the frequency locations of a power spectrum (1) obtained at the pulse generator output.

In one aspect the invention proposes a solution to concentrate a lower-frequency spectrum of discrete tones around the set of higher-frequency equally distributed discrete tones, where the lower-frequency power spectrum gets possibly distorted differently for each of the higher-frequency tones due to linear and non-linear effects of the additional required circuitry. These distortions are of no importance. In most cases a pulse generator does the final shaping of the generated pulse. The importance is to generate power, distorted or not, at frequencies of interest without wasting power in frequency ranges without interest and as such increasing the power in the frequency ranges of interest. This innovation is highly advantageous for calibrating and synchronizing receivers for modulated signals where the carrier and its harmonics are present, where typically the modulation bandwidths are lower than the frequency spacing between the carrier and its harmonics. The higher-frequency discrete tones of the above-mentioned existing comb generator map on the harmonics and the discrete power spectrum around these higher-frequency discrete tones (created by other means) maps on the modulation.

This solution can be realized by gating comb generator pulses, either shaped or not shaped by a pulse generator, using a gating or multiplying circuit 300, which gates or multiplies these pulses at a much lower frequency rate (FIG. 7) than the pulse rate of the comb generator (100) in the first signal path with optionally a pulse shaping network (200). The comb generator pulses from the first pulse generator run at a higher clock frequency compared to the equivalent clock frequency which would be needed to generate a dense frequency grid to cover at least the frequencies of interest with the existing approach. Indeed, the first mentioned comb generator only generates the sparse frequency grid. Through the properly selected gating process driven by the second comb generator 150, dense spectral components are generated around the spectral components of the sparse frequency grid.

The comb generator in the first signal path (100 and, optionally, 200—see FIG. 6) generates a sparse frequency grid with a large frequency spacing. As already mentioned it can use a PRBS approach to generate the signal more efficiently. The comb generator 150 in the second signal path (FIG. 7) gates or multiplies the signal generated by 100 and 200 at a slower pace. This can be done by gating at a much lower frequency range, possibly taking advantage of a PRBS, which optimizes the power distribution around the discrete tones. As a result a dense set of spectral components can be generated around the tones of the sparse frequency grid (FIG. 7) with an optimal power spectrum.

Figure 7:
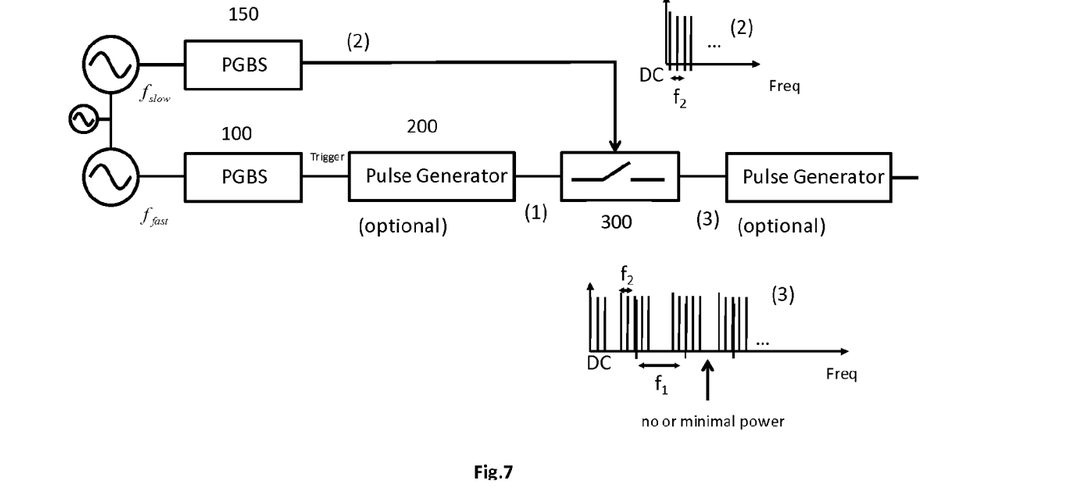
FIG. 7 illustrates an embodiment of the solution according to the invention.

Both comb generators can be generated from the same reference clock or can be locked together by means of a phase locked loop mechanism (FIG. 7). As such the signals in both paths remain phase coherent.

Figure 8:
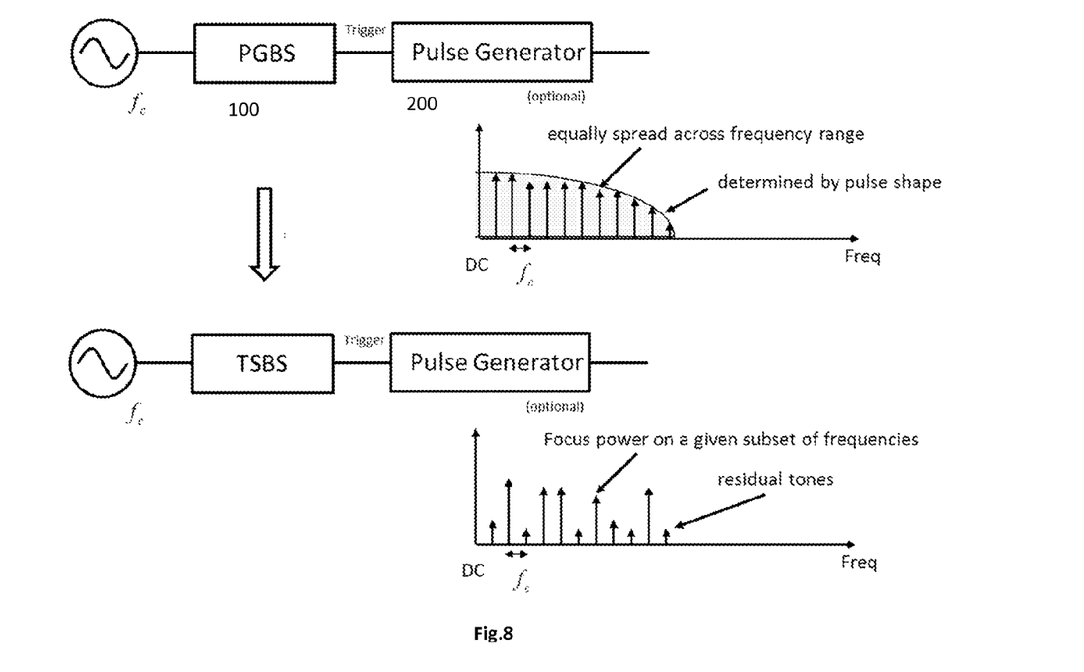
FIG. 8 represents a generator with a so called Tone Selective Bit Sequence.

In the above both for the first and second path a PGBS was used to generate a set of discrete tones. Both with the divider and the PRBS approach as PGBS, the tones are spread equally across the frequency range with a maximum frequency, determined by the pulse width and the pulse shape. With the PRBS it is known to have some larger tones at multiples of the clock frequency. It is only in the gating or multiplication process that spectral components get concentrated in the frequency domain. One aspect of the invention relates to the use of a special periodic bit sequence as PGBS to optimize the power levels on selected discrete tones for one of the paths or for both paths (FIG. 8). The generator with the special periodic bit sequence is referred to as "Tone Selective Bit Sequence" (TSBS).

It is possible to use a global optimization algorithm to calculate a bit sequence that optimizes the power levels at given discrete spectral components and reduce the power at the other spectral tones (see residual tones—FIG. 8). This bit sequence is also periodic.

To determine the periodic bit sequence resulting in increased power at selected non-equidistant frequencies while reducing the power at other frequencies, one can use different approaches to determine a global optimization algorithm. One implementation of such algorithm comprises generating a baseband time domain signal containing the desired tones, set for example to 1 with a random phase to minimize the crest factor. The undesired tones are set to zero. The goal is to create a sequence of ones and zeros such that the resulting spectrum is as close as possible to the desired one. One implementation simply uses clipping: a positive or zero sample value gets a "1" and a negative value corresponds to a "0". This bit sequence is used as replacement for the above divider or PRBS, which are known in the art. This new sequence concentrates power on the desired spectral tones, while reducing the power on the undesired tones. To extend the frequency range the TSBS can also be followed by a pulse generator or pulse shaping network.

Due to the nature of the signals, comprising of repetitive pulses, the pattern of the selected frequencies will repeat as harmonically related spectral components. To generate tones on an arbitrary grid extending into the frequency range determined by the pulse generator or pulse shaping network, one possibly needs to generate tones at lower frequencies which are harmonically related to the tones at the requested higher frequency.

In a similar way as the PRBS, the TSBS can be preceded by a divider to reduce the clock speed.

The gating or multiplication circuit can be followed by a pulse shaping or pulse generating circuit (see FIG. 7). This circuit uses the pulses coming out of the gating or multiplication circuit as a trigger to generate typically a pulse which is much more narrowband. In this way the frequency range of the reference or calibration signal is being expanded depending on the pulse width and the pulse shape.

Figure 9:
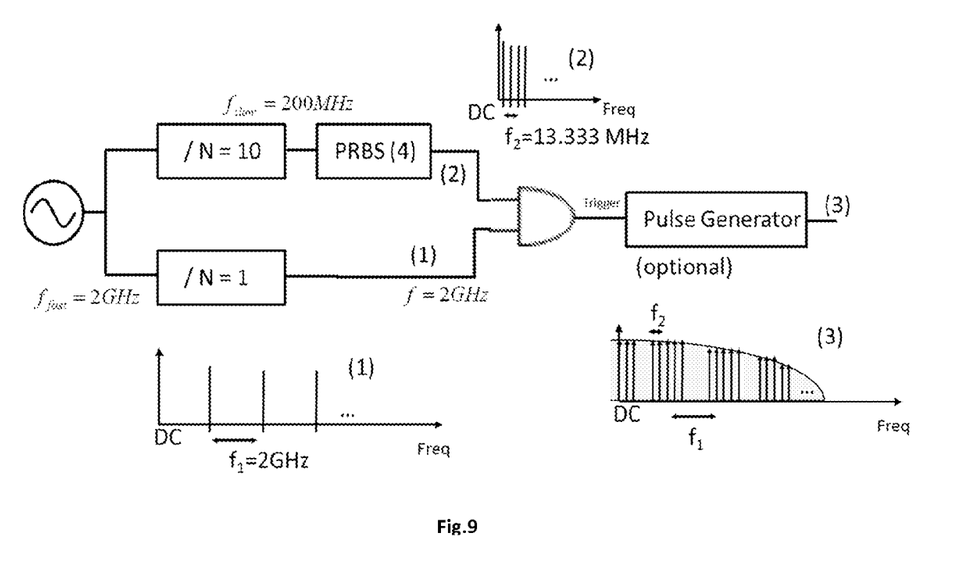
FIG. 9 illustrates an embodiment with logic gates and a pulse generator driven by an AND gate as gating circuit.

The actual implementation of the solution as explained above can be realised in many different ways. One way involves the use of logic gates with an AND gate as gating circuit. To extend the frequency range the AND gate can followed by a pulse generator as shown in FIG. 9. Another embodiment is to implement the generation of the bit sequence and the logic gates including the gating or multiplication functionality into a FPGA or a variant of a FPGA, possibly followed by a pulse generator. To use the solution as a calibration or reference signal the device can be foreseen of a memory or storage means such that the pulse characteristics can be stored and recalled during the calibration process.

The reference signal generator of the present invention can be used to calibrate sampler-based or real-time oscilloscopes, network analyzers and vector signal analyzers, which are typically used to measure the type of signals as described in this invention (FIG. 1).

The invention can also be applied to generate a synchronization signal for a mixer-based receiver to scan the tones of a signals as described in FIG. 1. The synchronization signal is measured by an additional receiver and used to normalize the measured signal against. Meanwhile the measurement channel by itself can be calibrated using the reference signal generator.

Another application is the calibration of the Low Frequency (LF) and Radio Frequency (RF) part of a receiver in a phase coherent way. The described signal contains a LF part (around DC) and a part around the fundamental (and higher harmonics). These parts are by generation phase coherent. As such it is possible to calibrate a receiver (possibly comprising a LF and RF part) for its LF and RF part in a phase coherent way.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for calibrating and for synchronizing a receiver comprising:
   receiving means for receiving a reference clock signal in a first and a second signal path;
   generating means for generating, in said first signal path, a first plurality of phase coherent tones derived from said reference clock signal and for generating, in said second signal path, a second plurality of phase coherent tones derived from said reference clock signal, said second plurality of phase-coherent tones being at lower frequencies than said first plurality of phase-coherent tones; and
   gating means for gating said first plurality of phase coherent tones by said second plurality of phase-coherent tones, such that the second plurality of phase-coherent tones of said second signal path appear in a distorted version around tones of said first plurality of phase-coherent tones of said first signal path, and for outputting a resulting gated signal.

2. The system for calibrating and for synchronizing a receiver as in claim 1, further comprising:
   storing means for storing at least one characteristic of said outputted gated signal.

3. The system for calibrating and for synchronizing a receiver as claim 1, further comprising:
   a pulse generating means arranged for receiving said outputted gated signal and for narrowing pulses in said outputted gated signal.

4. The system for calibrating and for synchronizing a receiver as in claim 1, wherein said generating means comprises in said first signal path and/or said second signal path a divider to reduce the frequency of said reference clock signal.

5. The system for calibrating and for synchronizing a receiver as in claim 1, wherein said generating means comprises in said first signal path and/or said second signal path a bit sequence generator.

6. The system for calibrating and for synchronizing a receiver as in claim 5, wherein said bit sequence generator is a pseudo-random bit sequence generator.

7. The system for calibrating and for synchronizing a receiver as in claim 5, wherein said bit sequence generator is a periodic bit sequence generator arranged for synthesizing a specific pattern of phase-coherent tones.

8. The system for calibrating and for synchronizing a receiver as in claim 5, wherein said generating means further comprises in said first signal path and/or said second signal path a divider to reduce the frequency of said reference clock signal.

9. The system for calibrating and for synchronizing a receiver as in claim 1, further comprising:
   a frequency synthesizing means for modifying the frequency of said reference clock signal.

10. The system for calibrating and for synchronizing a receiver as in claim 1, wherein at least a part of said generating means is implemented on a field programmable gate array.

11. A method for calibrating and for synchronizing a receiver, comprising:
    receiving a reference clock signal in a first and a second signal path;
    generating, in said first signal path, a first plurality of phase coherent tones derived from said reference clock signal and generating, in said second signal, path a second plurality of phase coherent tones derived from said reference clock signal, said second plurality of phase-coherent tones being at lower frequencies than said first plurality of phase-coherent tones; and
    gating said first plurality of phase coherent tones by said second plurality of phase-coherent tones, such that the second plurality of phase-coherent tones of said second signal path appear in a distorted version around tones of said first plurality of phase-coherent tones of said first signal path, and outputting a resulting gated signal.

12. The method for calibrating and for synchronizing a receiver as in claim 11, wherein said generating is performed using a bit sequence generator.

13. The method for calibrating and for synchronizing a receiver as in claim 12, wherein a periodic bit sequence is applied for synthesizing a specific pattern of phase-coherent tones.

14. The method for calibrating and for synchronizing a receiver as in claim 11, wherein said gating is performed using logic circuitry.

15. The method for calibrating and for synchronizing a receiver as in claim 11, further comprising:
  receiving, by a pulse generator, said outputted gated signal; and
  narrowing, by the pulse generator, pulses in said outputted gated signal.

16. The method for calibrating and for synchronizing a receiver as in claim 11, wherein said generating comprises:
  reducing, by a divider in said first signal path and/or said second signal, the frequency of said reference clock signal.

17. The method for calibrating and for synchronizing a receiver as in claim 11, wherein said generating is performed at least in part by a bit sequence generator in said first signal path and/or said second signal path.

18. The method for calibrating and for synchronizing a receiver as in claim 17, wherein said bit sequence generator is a pseudo-random bit sequence generator.

19. The method for calibrating and for synchronizing a receiver as in claim 17, wherein said bit sequence generator is a periodic bit sequence generator configured to synthesize a specific pattern of phase-coherent tones.

20. A system for calibrating and for synchronizing a receiver, said system arranged for receiving a reference clock signal in a first and a second signal path, and comprising:
  a generator, configured to:
    generate, in said first signal path, a first plurality of phase coherent tones derived from said reference clock signal; and
    generate, in said second signal path, a second plurality of phase coherent tones derived from said reference clock signal, said second plurality of phase-coherent tones being at lower frequencies than said first plurality of phase-coherent tones; and
  a gating or multiplying circuit, configured to:
    gate said first plurality of phase coherent tones by said second plurality of phase-coherent tones, such that the second plurality of phase-coherent tones of said second signal path appear in a distorted version around tones of said first plurality of phase-coherent tones of said first signal path; and
    output a resulting gated signal.

21. The system for calibrating and for synchronizing a receiver as in claim 20, wherein said generator comprises a bit sequence generator.

22. The system for calibrating and for synchronizing a receiver as in claim 20, wherein said generator comprises a divider in said first signal path and/or said second signal, wherein the divider is configured to reduce the frequency of said reference clock signal.

23. The system for calibrating and for synchronizing a receiver as in claim 20, further comprising:
  a pulse generator configured to receive said outputted gated signal and to narrow pulses in said outputted gated signal.

* * * * *